F. KITZSTEINER.
ALCOHOL LAMP.
APPLICATION FILED MAR. 16, 1908.

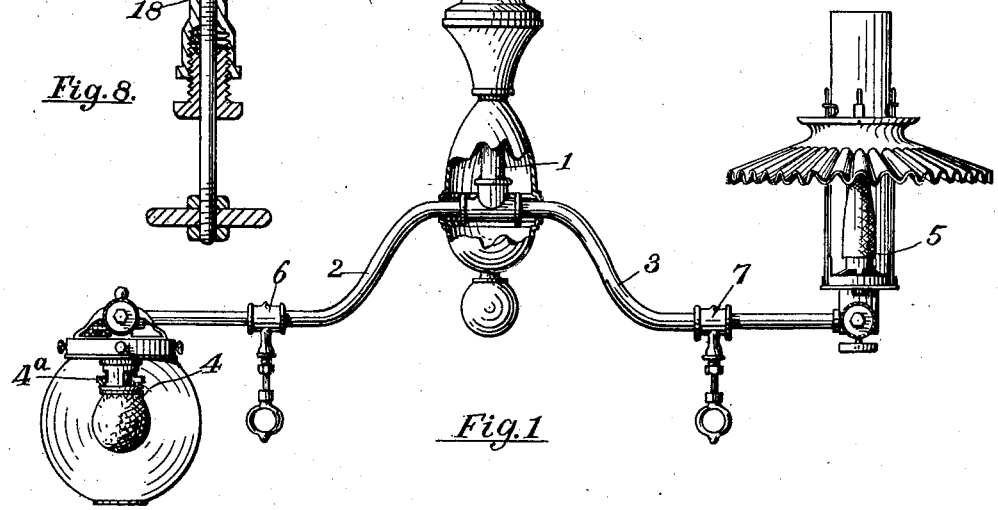

978,901.

Patented Dec. 20, 1910.

2 SHEETS—SHEET 2.

Witnesses
H. O. Van Antwerp
Georgiana Chace

Inventor
Frank Kitzsteiner
By Luther V. Moulton
Attorney

THE NORRIS PETERS CO., WASHINGTON, D.

UNITED STATES PATENT OFFICE.

FRANK KITZSTEINER, OF GRAND RAPIDS, MICHIGAN, ASSIGNOR TO THE QUICK WORK STOVE COMPANY, OF CLEVELAND, OHIO, A CORPORATION OF OHIO.

ALCOHOL-LAMP.

978,901.   Specification of Letters Patent.   Patented Dec. 20, 1910.

Application filed March 16, 1908. Serial No. 421,327.

*To all whom it may concern:*

Be it known that I, FRANK KITZSTEINER, a citizen of the United States of America, residing at Grand Rapids, in the county of Kent and State of Michigan, have invented certain new and useful Improvements in Alcohol-Lamps; and I do hereby declare the following to be a full, clear, and exact description of the invention, such as will enable others skilled in the art to which it appertains to make and use the same.

Figure 3:
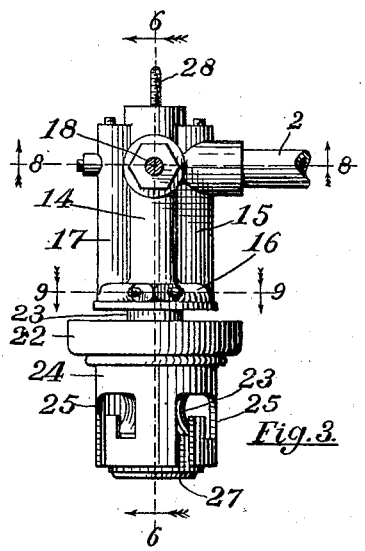
Figure 4:
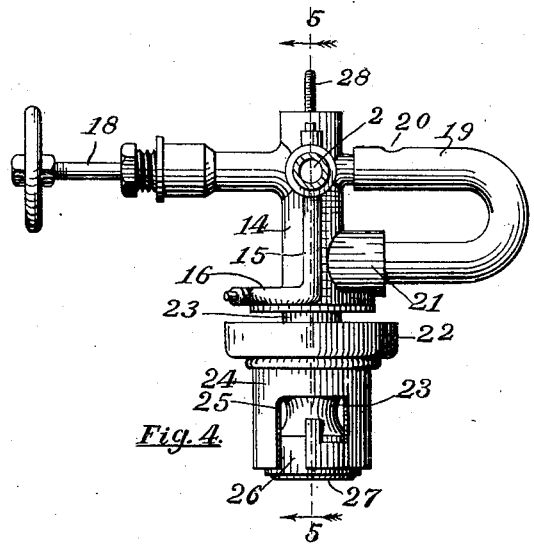
Figure 5:
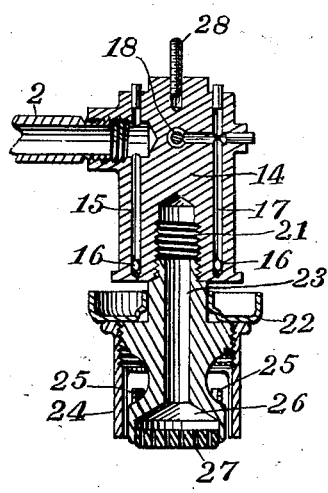
Figure 6:
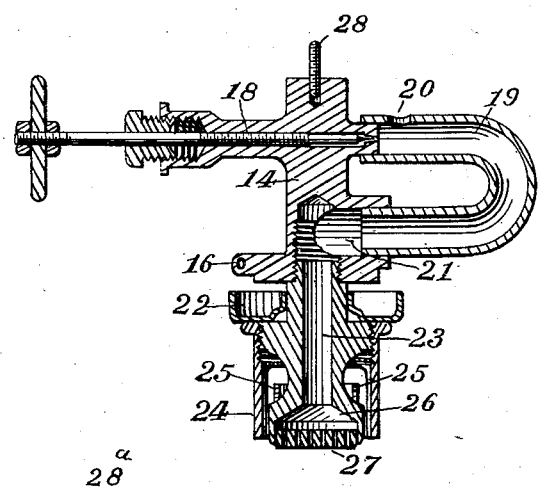
Figure 7:
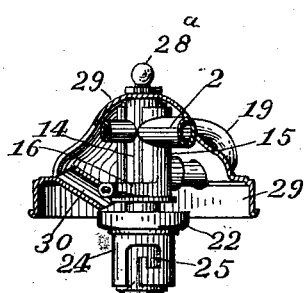

My invention relates to improvements in alcohol lamps and its object is to provide the same with means whereby the alcohol may be vaporized; and the vapor mixed with air, and burned to heat an incandescent mantle; and to provide the device with various new and useful features as hereinafter more fully described and particularly pointed out in the claims, reference being had to the accompanying drawings, in which:

Figure 1. is an elevation of a complete device embodying my invention with parts broken away; Fig. 2. an enlarged detail of the same in vertical section; Fig. 3. an enlarged detail in elevation of the inverted burner proper; Fig. 4. the same shown at right angles to Fig. 3.; Fig. 5. a vertical section on the line 5—5 of Fig. 4.; Fig. 6. the same on the line 6—6 of Fig. 3.; Fig. 7. a detail partially in section showing the hood covering the burner; Fig. 8. a horizontal section on the line 8—8 of Fig. 3.; and Fig. 9. the same on the line 9—9 of Fig. 3.

Like numbers refer to like parts in all of the figures.

The device consists essentially of a reservoir for the alcohol located at an elevation above the burners and supplying the same with alcohol under gravity pressure, burners provided with improved means for vaporizing the alcohol, means for discharging the vapor through a needle valve into means for mixing the vapor with air, and a perforated screen or fire stop through which the mixture escapes and is burned in proper relation to an incandescent mantle.

Referring to the drawings, 1 represents a vertically disposed tube having oppositely extended branches 2 and 3 at the lower end, on the outer ends of which are mounted the burners 4 and 5, the burner 4 being the inverted type and the burner 5 the upright type, the mantle and surrounding parts thereof being of the usual construction. The alcohol is permitted to flow to these burners through valves 6 and 7. This device is suspended from any suitable support, preferably the screw-threaded end of a pipe, by means of a screw-threaded socket 8 attached thereto and having a tubular extension $8^a$ provided with bayonet slots 9. The upper end of the tube 1 is inserted in this extension and provided with a transverse pin 10 engaging the slots 9 and detachably supporting the tube 1 and a collar $11^a$ on the top of the reservoir, which engages the divided lower end of the extension, thus forming a strong detachable fastening and support. Clearance is provided between these tubes and collar which furnishes ventilation for a reservoir 11 attached to the tube 1 and provided with a removable plug 13 for filling the same. An opening 12 in the tube 1 permits alcohol to enter the same from the bottom of the reservoir 11.

The vaporizer consists of a metal body 14 attached near its upper end to the branch tube 2 and extending downward therefrom. A passage 15 in the vaporizer communicates with the tube 2 at the upper end and extends thence downward within the side of the vaporizer adjacent to the tube 2 and at one side of its axis and thence horizontally around the axis of the vaporizer as at 16 to the opposite side thereof and thence upward as at 17 to near the top of the vaporizer and thence inward to the needle valve 18. This circuitous passage insures proper vaporization of the alcohol when the vaporizer is heated.

Opposite the valve 18 and to receive the vapor from the same is one end of a U-shaped mixing tube 19 having an air inlet opening 20 close to the needle valve and extending thence downward in a semi-circular curve and opening into a chamber 21 in the axis of the vaporizer. Communicating with this chamber 21 and extending downward therefrom is a burner tube 23 having a truncated conical chamber 26 at its lower end closed by a perforated disk 27 having numerous openings therein, which disk serves as a fire stop through which the mixture of air and vapor escapes and is burned within the inverted mantle. This chamber 26 must not be too large or the fire will pass the stop 27. To support the mantle, a detachable sleeve 24 surrounds the tube 23 and is provided with bayonet slots 25 with which the mantle support 4ª of the usual form engages. With this form of burner, I prefer to cover the same with a hood 29 to support the globe and to aid in concentrating the heat upon the vaporizer. Through this hood extends diagonally downward and inward a tube 30 for conveying alcohol to a cup 22 mounted on the tube 23 and located below the vaporizer. When alcohol is placed in the cup and ignited, it serves to provide initial heat to start the vaporizer. This hood is retained in place by a screw 28 on top of the vaporizer and having a nut 28ª thereon. The mantle and flame being located beneath the vaporizer, the heat rises sufficiently to properly heat the latter.

What I claim is:

1. In an alcohol lamp, a vaporizer comprising a body attached near its top to a tube and having a passage extending downward within one side of the body and thence partially around its axis and thence upward within the opposite side of the body in the opposite direction, and thence inward to the axis of the body opposite the said tube, a horizontally disposed needle valve communicating with the inner end of said passage, a U-shaped mixing tube communicating with the needle valve, and a downwardly projecting burner communicating with the mixing tube.

2. An alcohol lamp comprising a reservoir to contain alcohol, a pipe extending downward therefrom, a vaporizer attached to the end of the pipe, a passage within one side of the vaporizer extending downward from the pipe and thence partially around the axis of the vaporizer, and thence upward and inward to opposite the pipe, a needle valve extending across the axis and communicating with said passage, a mixing tube communicating with the needle valve, and a burner communicating with the mixing tube and extending downward therefrom.

3. In an alcohol lamp, a vaporizer attached to a tube and having a passage extending downward from the tube within one side and thence partially around the axis of the vaporizer to the other side thereof and thence in an opposite direction within the other side thereof and thence to its axis and opposite the tube, a needle valve extending transversely across the axis and communicating with the end of said passage, a U-shaped mixing tube communicating with the needle valve at one end and having a lateral opening to admit air and also communicating with a chamber below the needle valve at the other end, a burner tube communicating with said chamber and having a truncated conical lower end, and a perforated disk to close the end of said burner tube.

4. In an alcohol lamp, the combination of a vaporizer attached to a tube to supply alcohol thereto, said vaporizer having a passage extending downwardly within one side and thence partially around the axis to a point within the opposite side, and thence oppositely upward in said opposite side, and thence inward to the axis and opposite said tube, a needle valve extending across the axis, a U-shaped mixing tube communicating with said valve at one end and having a lateral opening near the valve to admit air and also communicating at the other end with a chamber below the needle valve and in the axis of the vaporizer, and a downwardly projecting burner tube communicating with said chamber and having an enlarged end closed by a perforated diaphragm.

In testimony whereof I affix my signature in presence of two witnesses.

FRANK KITZSTEINER.

Witnesses:
L. V. MOULTON,
PALMER A. JONES.